US011119781B2

(12) United States Patent
Williams et al.

(10) Patent No.: US 11,119,781 B2
(45) Date of Patent: *Sep. 14, 2021

(54) SYNCHRONIZED ACCESS TO DATA IN SHARED MEMORY BY PROTECTING THE LOAD TARGET ADDRESS OF A FRONTING LOAD

(71) Applicant: INTERNATIONAL BUSINESS MACHINES CORPORATION, Armonk, NY (US)

(72) Inventors: Derek E. Williams, Round Rock, TX (US); Guy L. Guthrie, Austin, TX (US); Hugh Shen, Round Rock, TX (US); Sanjeev Ghai, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 80 days.

This patent is subject to a terminal disclaimer.

(21) Appl. No.: 16/216,659

(22) Filed: Dec. 11, 2018

(65) Prior Publication Data

US 2020/0183696 A1 Jun. 11, 2020

(51) Int. Cl.
*G06F 9/38* (2018.01)
*G06F 9/34* (2018.01)
(Continued)

(52) U.S. Cl.
CPC ........ *G06F 9/3834* (2013.01); *G06F 9/30043* (2013.01); *G06F 9/34* (2013.01);
(Continued)

(58) Field of Classification Search
CPC ............... G06F 9/3004; G06F 9/30087; G06F 9/30043; G06F 9/3834; G06F 9/3863; G06F 9/3891; G06F 9/52; G06F 9/526
(Continued)

(56) References Cited

U.S. PATENT DOCUMENTS 5,193,167 A    3/1993 Sites et al.
5,611,074 A *  3/1997 Kantz ................. G06F 12/0815
                                                    710/220
(Continued)

FOREIGN PATENT DOCUMENTS

WO    2017178925 A1    10/2017

OTHER PUBLICATIONS

Retter et al. U.S. Appl. No. 15/873,570, filed Jan. 17, 2018, Non-Flnal Office Action dated Jun. 26, 2019.

(Continued)

*Primary Examiner* — Aimee Li
*Assistant Examiner* — Shawn Doman
(74) *Attorney, Agent, or Firm* — David M. Quinn; Brian F. Russell

(57) ABSTRACT

A data processing system includes multiple processing units all having access to a shared memory. A processing unit of the data processing system includes a processor core including an upper level cache, core reservation logic that records addresses in the shared memory for which the processor core has obtained reservations, and an execution unit that executes memory access instructions including a fronting load instruction. Execution of the fronting load instruction generates a load request that specifies a load target address. The processing unit further includes lower level cache that, responsive to receipt of the load request and based on the load request indicating an address match for the load target address in the core reservation logic, protects the load target address against access by any conflicting memory access request during a protection interval following servicing of the load request.

20 Claims, 9 Drawing Sheets

(51) Int. Cl.

| | | |
|---|---|---|
| *G06F 9/54* | (2006.01) | |
| *G06F 12/0811* | (2016.01) | |
| *G06F 9/30* | (2018.01) | |
| *G06F 9/52* | (2006.01) | |
| *G06F 12/0842* | (2016.01) | |
| *G06F 12/0891* | (2016.01) | |
| *G06F 12/0888* | (2016.01) | |
| *G06F 12/0831* | (2016.01) | |

(52) U.S. Cl.
CPC .......... *G06F 9/544* (2013.01); *G06F 12/0811* (2013.01); *G06F 2212/283* (2013.01)

(58) Field of Classification Search
USPC .......................................... 712/214; 718/107
See application file for complete search history.

(56) References Cited

U.S. PATENT DOCUMENTS

| | | | |
|---|---|---|---|
| 5,706,464 A | 1/1998 | Moore et al. | |
| 5,895,484 A | 4/1999 | Arimilli et al. | |
| 5,895,495 A | 4/1999 | Arimilli et al. | |
| 5,968,135 A * | 10/1999 | Teramoto | G06F 9/52 709/248 |
| 6,067,603 A | 5/2000 | Carpenter et al. | |
| 6,067,611 A | 5/2000 | Carpenter et al. | |
| 6,081,874 A | 6/2000 | Carpenter et al. | |
| 6,108,764 A | 8/2000 | Baumgartner et al. | |
| 6,115,804 A | 9/2000 | Carpenter et al. | |
| 6,122,674 A | 9/2000 | Olnowich | |
| 6,338,122 B1 | 1/2002 | Baumgartner et al. | |
| 6,546,429 B1 | 4/2003 | Baumgartner et al. | |
| 6,549,989 B1 | 4/2003 | Arimilli et al. | |
| 6,591,307 B1 | 7/2003 | Arimilli et al. | |
| 6,611,872 B1 | 8/2003 | McCanne | |
| 6,615,322 B2 | 9/2003 | Arimilli et al. | |
| 6,622,189 B2 * | 9/2003 | Bryant | G06F 9/52 710/200 |
| 6,625,701 B1 | 9/2003 | Arimilli et al. | |
| 6,629,209 B1 | 9/2003 | Arimilli et al. | |
| 6,629,210 B1 | 9/2003 | Arimilli et al. | |
| 6,629,212 B1 * | 9/2003 | Arimilli | G06F 12/0815 711/141 |
| 6,629,214 B1 | 9/2003 | Arimilli et al. | |
| 6,633,959 B2 | 10/2003 | Arimilli et al. | |
| 6,711,652 B2 | 3/2004 | Arimilli et al. | |
| 6,725,358 B1 | 4/2004 | Moore | |
| 6,748,501 B2 | 6/2004 | Arimilli et al. | |
| 6,801,986 B2 | 10/2004 | Steely, Jr. et al. | |
| 6,839,816 B2 | 1/2005 | Borkenhagen et al. | |
| 7,127,561 B2 | 10/2006 | Hill et al. | |
| 7,200,717 B2 | 4/2007 | Guthrie et al. | |
| 7,228,385 B2 | 6/2007 | Guthrie et al. | |
| 7,254,678 B2 | 8/2007 | Alexander et al. | |
| 7,328,293 B2 | 2/2008 | Hammarlund et al. | |
| 7,363,474 B2 | 4/2008 | Rodgers et al. | |
| 7,444,494 B2 | 10/2008 | Goodman et al. | |
| 7,480,771 B2 | 1/2009 | Moir et al. | |
| 7,529,893 B2 | 5/2009 | Landin et al. | |
| 7,620,954 B2 | 11/2009 | Mattina et al. | |
| 7,818,388 B2 | 10/2010 | Arimilli et al. | |
| 8,140,770 B2 | 3/2012 | Clark et al. | |
| 8,521,963 B1 | 8/2013 | Miao et al. | |
| 8,539,485 B2 | 9/2013 | Snyder et al. | |
| 8,775,906 B2 | 7/2014 | Dodson et al. | |
| 8,825,982 B2 | 9/2014 | Kultursay et al. | |
| 8,949,539 B2 | 2/2015 | Blumrich et al. | |
| 9,058,273 B1 | 6/2015 | Hollaway, Jr. et al. | |
| 9,176,877 B2 | 11/2015 | Hollaway, Jr. et al. | |
| 9,390,026 B2 | 7/2016 | Guthrie et al. | |
| 9,396,127 B2 | 7/2016 | Guthrie et al. | |
| 9,430,166 B2 | 8/2016 | Frey et al. | |
| 9,465,670 B2 | 10/2016 | Grochowski et al. | |
| 9,514,046 B1 | 12/2016 | Nowak et al. | |
| 9,569,364 B1 * | 2/2017 | Heyrman | G06F 12/0842 |
| 2003/0009623 A1 | 1/2003 | Arimilli et al. | |
| 2003/0033489 A1 * | 2/2003 | Fujiyama | G06F 9/526 711/147 |
| 2003/0041225 A1 | 2/2003 | Mattina et al. | |
| 2003/0126379 A1 | 7/2003 | Kaushik et al. | |
| 2003/0217115 A1 | 11/2003 | Rowlands | |
| 2004/0073909 A1 | 4/2004 | Arimilli et al. | |
| 2004/0230750 A1 | 11/2004 | Blake et al. | |
| 2004/0236914 A1 | 11/2004 | Day et al. | |
| 2005/0160226 A1 | 7/2005 | Averill et al. | |
| 2006/0085603 A1 | 4/2006 | Guthrie et al. | |
| 2006/0179244 A1 | 8/2006 | Goodman et al. | |
| 2006/0179253 A1 | 8/2006 | Fields, Jr. et al. | |
| 2006/0200633 A1 | 9/2006 | Hosoe et al. | |
| 2006/0271744 A1 | 11/2006 | Goodman et al. | |
| 2007/0033345 A1 | 2/2007 | Guthrie et al. | |
| 2007/0124546 A1 | 5/2007 | Blanchard et al. | |
| 2007/0150664 A1 | 6/2007 | Dombrowski et al. | |
| 2007/0226427 A1 | 9/2007 | Guthrie et al. | |
| 2008/0120625 A1 | 5/2008 | Clark et al. | |
| 2008/0215824 A1 | 9/2008 | Goodman et al. | |
| 2008/0294412 A1 * | 11/2008 | Johns | G06F 9/30043 703/15 |
| 2009/0198695 A1 | 8/2009 | Arimilli et al. | |
| 2009/0198918 A1 | 8/2009 | Arimilli et al. | |
| 2009/0307660 A1 | 12/2009 | Srinivasan | |
| 2010/0049952 A1 * | 2/2010 | Eddy | G06F 9/3834 712/223 |
| 2010/0235577 A1 | 9/2010 | Guthrie et al. | |
| 2011/0047352 A1 | 2/2011 | Ganfield et al. | |
| 2011/0161590 A1 * | 6/2011 | Guthrie | G06F 9/3834 711/122 |
| 2011/0179082 A1 * | 7/2011 | Vaghani | G06F 16/1774 707/781 |
| 2012/0027843 A1 | 2/2012 | Minamino et al. | |
| 2012/0198167 A1 | 8/2012 | Guthrie et al. | |
| 2012/0278431 A1 | 11/2012 | Luna | |
| 2013/0205096 A1 | 8/2013 | Guthrie et al. | |
| 2013/0205099 A1 * | 8/2013 | Guthrie | G06F 12/0831 711/146 |
| 2014/0115267 A1 | 4/2014 | Pierson et al. | |
| 2014/0250276 A1 | 9/2014 | Blaner et al. | |
| 2014/0310480 A1 | 10/2014 | Piry et al. | |
| 2015/0052315 A1 | 2/2015 | Ghai et al. | |
| 2015/0113226 A1 | 4/2015 | Accapadi et al. | |
| 2015/0161054 A1 * | 6/2015 | Ghai | G06F 12/0811 711/135 |
| 2015/0242327 A1 * | 8/2015 | Guthrie | G06F 12/0891 711/122 |
| 2016/0019063 A1 * | 1/2016 | Rappoport | G06F 9/30 712/212 |
| 2016/0364332 A1 | 12/2016 | Nowak et al. | |
| 2017/0031729 A1 | 2/2017 | Grochowski et al. | |
| 2017/0293558 A1 | 10/2017 | Guthrie et al. | |
| 2018/0089083 A1 | 3/2018 | Deshpande | |
| 2018/0276046 A1 | 9/2018 | Joao et al. | |
| 2020/0142829 A1 | 5/2020 | Wang et al. | |
| 2020/0167284 A1 | 5/2020 | Jalal et al. | |

OTHER PUBLICATIONS

Retter et al. U.S. Appl. No. 15/873,515, filed Jan. 17, 2018, Notice of Allowance dated Apr. 4, 2019.
Williams et al. U.S. Appl. No. 16/184,522, filed Nov. 8, 2018, Non-Final Office Action dated Apr. 20, 2020.
Williams et al. U.S. Appl. No. 16/049,011, filed Jul. 30, 2018, Non-Final Office Action dated Dec. 23, 2019.
Williams et al. U.S. Appl. No. 16/049,011, filed Jul. 30, 2018, Notice of Allowance dated Mar. 18, 2020.
Guthrie et al. U.S. Appl. No. 15/873,366, filed Jan. 17, 2018, Non-Final Office Action dated Apr. 5, 2019.
Guthrie et al. U.S. Appl. No. 15/873,366, filed Jan. 17, 2018, Notice of Allowance dated Jul. 11, 2019.
Guthrie et al. U.S. Appl. No. 15/873,366, filed Jan. 17, 2018, Notice of Allowance dated Oct. 21, 2019.

(56) References Cited

OTHER PUBLICATIONS

Williams, et al., U.S. Appl. No. 16/172,413, filed Oct. 26, 2020, Non-Final Office Action dated Nov. 13, 2019.
Williams, et al., U.S. Appl. No. 16/172,413, filed Oct. 26, 2020, Final Office Action dated Apr. 7, 2020.
Williams, et al., U.S. Appl. No. 16/172,413, filed Oct. 26, 2020, Advisory Action dated Jun. 15, 2020.
Williams, et al., U.S. Appl. No. 16/172,413, filed Oct. 26, 2020, Non-Final Office Action dated Aug. 20, 2020.

* cited by examiner

200 loop:
```
larx  r1, var      —202
add   r1, 1        —204
stcx  var, r1      —206
beq loop           —208
```

FIG. 2A

210 loop:
```
load  r1, lock     —220  ⎫
cmp   r1, 1        —222  ⎬ 212
beq loop           —224  ⎭ larx  r1, lock     —230  ⎫
cmp   r1, 1        —232  ⎪
beq loop           —234  ⎪
li    r2, 1        —236  ⎬ 214
stcx  lock, r2     —238  ⎪
beq loop           —239  ⎭ barrier            —240  ⎫
...                       ⎪
(critical section         ⎬ 216
 instructions)            ⎪
...                       ⎪
barrier            —244  ⎭ li    r2, 0        —250  ⎫
store lock, r2     —252  ⎬ 218
```

FIG. 2B

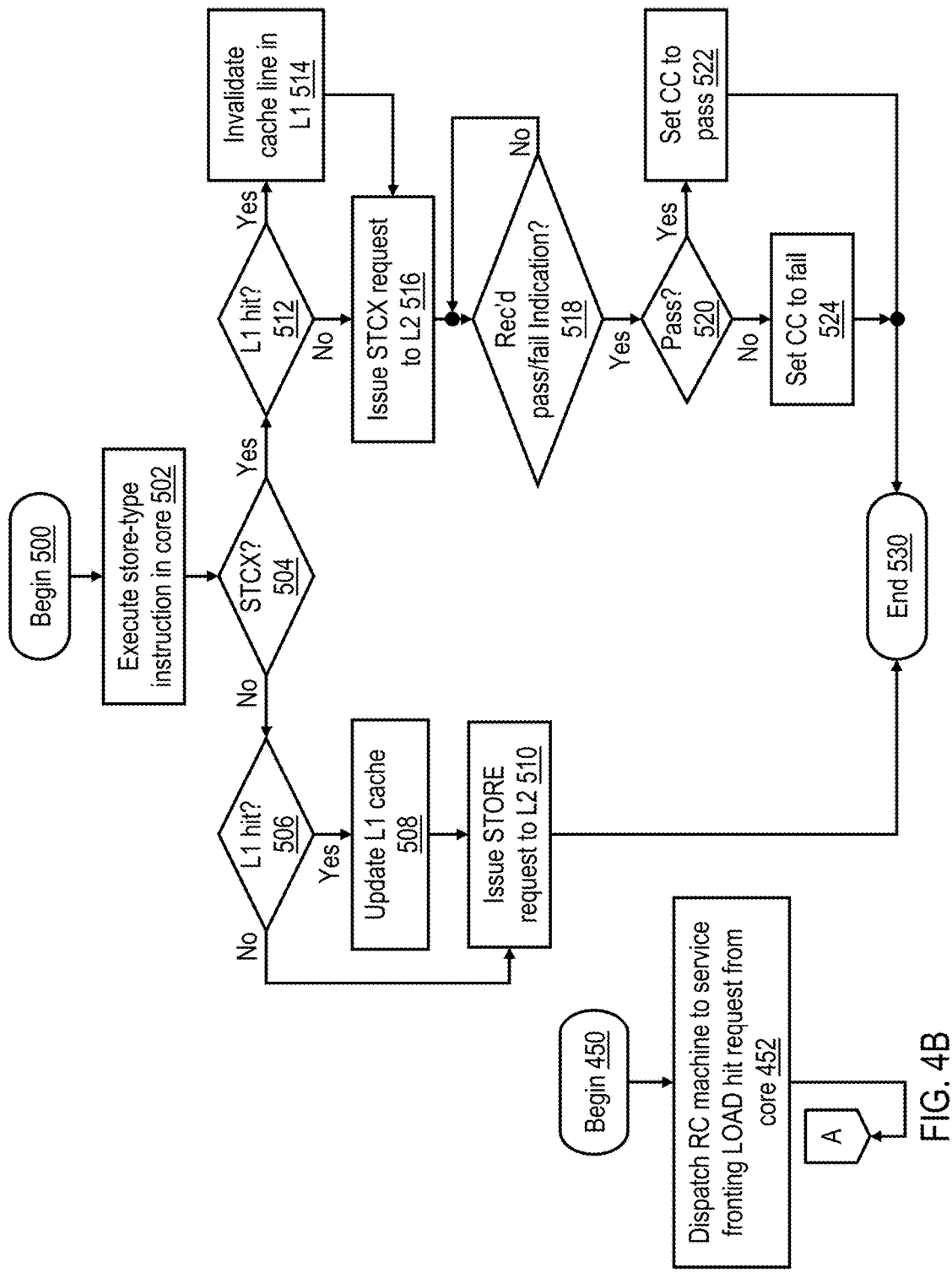

SYNCHRONIZED ACCESS TO DATA IN SHARED MEMORY BY PROTECTING THE LOAD TARGET ADDRESS OF A FRONTING LOAD

BACKGROUND OF THE INVENTION

The present invention relates in general to data processing system and, in particular, to managing accesses to data in shared memory of a data processing system. Still more particularly, the present invention relates to a processor, data processing system and method for synchronizing accesses to data in a shared memory.

In shared memory multiprocessor (MP) data processing systems, each of the multiple processors in the system may access and modify data stored in the shared memory. In order to synchronize access to a particular granule (e.g., cache line) of memory between multiple processing units and threads of execution, load-reserve and store-conditional instruction pairs are often employed. For example, load-reserve and store-conditional instructions have been implemented in the POWER® instruction set architecture with request codes (opcodes) associated with various mnemonics, referred to herein generally as LARX and STCX. The goal of load-reserve and store-conditional instruction pairs is to load and modify data and then to commit the modified data to coherent memory only if no other thread of execution has modified the data in the interval between the load-reserve and store-conditional instructions. Thus, a read-modify-write operation targeting shared memory can be emulated without the use of an atomic update primitive that strictly enforces atomicity.

BRIEF SUMMARY

According to at least one embodiment, a data processing system includes multiple processing units all having access to a shared memory. A processing unit of the data processing system includes a processor core including an upper level cache, core reservation logic that records addresses in the shared memory for which the processor core has obtained reservations, and an execution unit that executes memory access instructions including a fronting load instruction. Execution of the fronting load instruction generates a load request that specifies a load target address. The processing unit further includes lower level cache that, responsive to receipt of the load request and based on the load request indicating an address match for the load target address in the core reservation logic, protects the load target address against access by any conflicting memory access request during a protection interval following servicing of the load request.

BRIEF DESCRIPTION OF THE SEVERAL VIEWS OF THE DRAWINGS

FIG. 2A depicts a first exemplary instruction sequence that employs load-reserve and store-conditional instructions to synchronize access to shared memory;

FIG. 2B illustrates a second exemplary instruction sequence that employs load-reserve and store-conditional instructions to coordinate execution of a critical section of a multithreaded program;

FIG. 4B is a high level logical flowchart of an exemplary method of processing a fronting load hit request in a lower level cache in accordance with one embodiment;

FIG. 5 is a high level logical flowchart of an exemplary method of processing a store-type instruction in a processor core in accordance with one embodiment;

DETAILED DESCRIPTION

Figure 1:
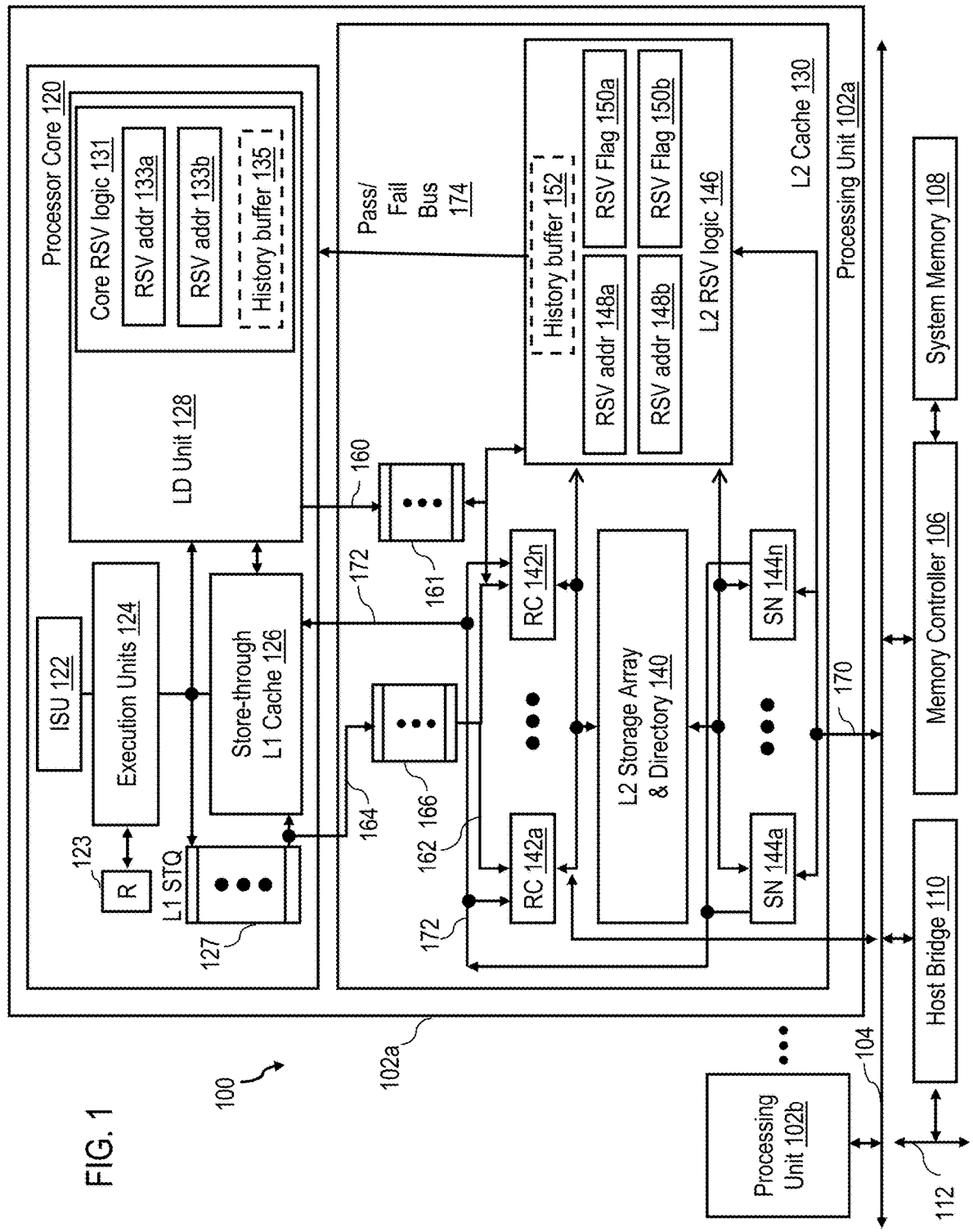
FIG. 1 is a high level block diagram of an illustrative data processing system in accordance with one embodiment.

With reference now to the figures and in particular with reference to FIG. 1, there is illustrated a high level block diagram of a data processing system 100 in accordance with one embodiment. As shown, data processing system 100 includes multiple processing units 102 (including at least processing units 102a-102b) for processing data and instructions. Processing units 102 are coupled for communication to a system interconnect 104 for conveying address, data and control information between attached devices. In the depicted embodiment, these attached devices include not only processing units 102, but also a memory controller 106 providing an interface to a shared system memory 108 and one or more host bridges 110, each providing an interface to a respective mezzanine bus 112. Mezzanine bus 112 in turn provides slots for the attachment of additional unillustrated devices, which may include network interface cards, I/O adapters, non-volatile memory, non-volatile storage device adapters, additional bus bridges, etc.

As further illustrated in FIG. 1, each processing unit 102, which may be realized as a single integrated circuit, includes one or more processor cores 120 (of which only one is explicitly shown) for processing instructions and data. Each processor core 120 includes an instruction sequencing unit (ISU) 122 for fetching and ordering instructions for execution, one or more execution units 124 for executing instructions dispatched from ISU 122, and a set of registers 123 for temporarily buffering data and control information. The instructions executed by execution units 124 include load-reserve and store-conditional instructions, which are utilized to synchronize access to shared memory between a particular thread of execution and other concurrent threads of execution, whether executing in the same processor core 120, a different processor core 120 in the same processing unit 102, or in a different processing unit 102. In a preferred embodiment, execution units 124 execute at least load-reserve and store-conditional instructions in-order (other instructions may or may not be executed out-of-order).

Each processor core 120 further includes an L1 store queue (STQ) 127 and a load unit 128 for managing the completion of store and load requests, respectively, corresponding to executed store and load instructions (including load-reserve and store-conditional instructions). In a preferred embodiment, L1 STQ 127 is implemented as a First-In, First-Out (FIFO) queue containing a plurality of queue entries. Store requests are accordingly loaded in the "top" entry of L1 STQ 127 at execution of the corresponding store instruction to determine the target address, and are initiated when the store request reaches the "bottom" or "commit" entry of L1 STQ 127. Load unit 128 includes core reservation logic 131 for recording addresses that are or have been reserved. Specifically, in the illustrated embodiment, core reservation logic 131 includes, for each hardware thread that may be concurrently executed by processor core 120, a respective reservation address register 133. In the depicted example, which assumes that processor core 120 can execute two concurrent hardware threads, core reservation logic 131 includes two reservation registers, namely, reservation address register 133*a* for thread 0 and reservation address register 133*b* for thread 1.

In the depicted embodiment, core reservation logic 131 may optionally further include a history buffer 135 that stores target addresses for which processor core 120 has previously obtained reservations. History buffer 152, if implemented, can be realized utilizing a variety of different data structures and can be managed utilizing a variety of different management policies. For example, in a first embodiment, history buffer 135 can include one shadow register per thread that is loaded with the address specified in the associated thread's RSV address register 133 prior to the RSV address register 133 being overwritten. In a second embodiment, history buffer 135 can alternatively be implemented as a N-deep FIFO buffer that stores that last N store target addresses of STCX requests of any hardware thread of processor core 120 (regardless of duplication of store target addresses). In a third embodiment, history buffer 135 can be implemented by a FIFO buffer as in the second embodiment, but including a comparator per entry to ensure that all store target addresses inserted into history buffer 135 are unique. Additional embodiments of and management policies for optional history buffer 135 will be apparent to those skilled in the art.

It is important to note that the present application makes a distinction between "instructions", such as load-reserve and store-conditional instructions, and "requests." Load and store "instructions" (including load-reserve and store-conditional instructions) are defined herein as inputs to an execution unit that include an request code (opcode) identifying the type of instruction and one or more operands specifying data to be accessed and/or its address. Load and store "requests," including load-reserve and store-conditional requests, are defined herein as data and/or signals generated following instruction execution that specify at least the target address of data to be accessed. Thus, load-reserve and store-conditional requests may be transmitted from a processor core 120 to the shared memory system to initiate data accesses, while load-reserve and store-conditional instructions are not.

The operation of processor core 120 is supported by a multi-level volatile memory hierarchy having, at its lowest level, shared system memory 108, and at its upper levels two or more levels of cache memory, which in the illustrative embodiment include a L1 cache 126 and a L2 cache 130. As in other shared memory multiprocessor data processing systems, the contents of the memory hierarchy may generally be accessed and modified by threads of execution executing in any processor core 120 in any processing unit 102 of data processing system 100.

In accordance with one embodiment, L1 cache 126, which may include bifurcated L1 data and instruction caches, is implemented as a store-through cache, meaning that the point of cache coherency with respect to other processor cores 120 is located below L1 cache 126 and, in the depicted embodiment, is located at store-in L2 cache 130. Accordingly, as described above, L1 cache 126 does not maintain true cache coherency states (e.g., Modified, Exclusive, Shared, Invalid) for its cache lines, but only maintains valid/invalid bits. Because L1 cache 126 is implemented as a store-through cache, store requests first complete relative to the associated processor core 120 in L1 cache 126 and then complete relative to other processing units 102 at a point of system-wide coherency, which in the depicted embodiment is L2 cache 130.

As further illustrated in FIG. 1, L2 cache 130 contains a storage array and directory 140 that store cache lines of instructions and data in association with their respective memory addresses and coherence states. L2 cache 130 also includes a number of read-claim state machines (RC machines) 142*a*-142*n* for independently and concurrently servicing memory access requests received from the associated processor cores 120. RC machines 142 receive core load requests from LD unit 128 in processor core 120 via load bus 160, an in-order L2 load queue (LDQ) 161, and command bus 162. Similarly, RC machines 142 receive core store requests from L1 STQ 127 in processor core 120 via store bus 164, an in-order L2 store queue (STQ) 166, and command bus 162.

L2 cache 130 further includes a number of snoop state machines (SN machine) 144*a*-144*n* for servicing memory access and other requests received from other processing units 102 via system interconnect 104 and snoop bus 170. SN machines 144 and RC machines 142 are each connected to a back-invalidation bus 172 by which any SN machine 144 or RC machine 142 can signal the invalidation of a cache line to processor core 120.

It is important to note that in a preferred embodiment L2 cache 130 is constructed such that at most a single one of RC machines 142 and SN machines 144 can be active servicing a request targeting a given target cache line address at any one time. Consequently, if a second request is received while a first request targeting the same cache line is already being serviced by an active RC machine 142 or SN machine 144, the later-in-time second request must be queued or rejected until servicing of the first request is completed and the active state machine returns to an idle state.

L2 cache 130 finally includes reservation logic 146 for recording reservations of the associated processor core 120. Specifically, in the illustrated embodiment, reservation logic 146 includes, for each thread that may be concurrently executed by the associated processor core 120, a respective reservation register comprising a reservation address field 148 and a reservation flag 150. In the depicted example, which assumes that processor core 120 can each execute two concurrent hardware threads, reservation logic 146 includes two reservation registers: reservation address field 148*a* and reservation flag 150*a* for thread 0 and reservation address field 148*b* and reservation flag 150*b* for thread 1. When set (e.g., to '1'), a reservation flag 150 indicates that the corresponding thread holds a reservation for the address contained in the associated reservation address field 148 and otherwise indicates no reservation is held. Reservation logic 146 supplies pass/fail indications indicating the success or failure of store-conditional (STCX) requests to processor cores 120 via pass/fail bus 174.

In the depicted embodiment, reservation logic 146 may optionally further include a history buffer 152 that stores target addresses for which processor core 120 has previously obtained reservations. History buffer 152, if implemented, can be realized utilizing a variety of different data structures and can be managed utilizing a variety of different management policies. For example, in a first embodiment, history buffer 152 can include one shadow register per thread that is loaded with the address specified in the associated thread's RSV address register 148 prior to the RSV address register 148 being overwritten. In a second embodiment, history buffer 152 can alternatively be implemented as a N-deep FIFO buffer that stores that last N store target addresses of successful core STCX requests of any thread (regardless of duplication of store target addresses). In a third embodiment, history buffer 152 can be implemented by a FIFO buffer as in the second embodiment, but including a comparator per entry to ensure that all store target addresses inserted into history buffer 152 are unique. Additional embodiments of and management policies for history buffer 152 will be apparent to those skilled in the art.

Those skilled in the art will additionally appreciate that data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

Multiprocessor data processing systems such as data processing system 100 of FIG. 1 implement a memory consistency model that specifies the legal possible executions of a given multiprocessor program with respect to memory accesses (e.g., among other things, the values that may be returned by load instructions, the order of writes to memory, those instruction execution dependencies that affect the ordering of memory accesses, and the final values for memory locations at the conclusion of a multiprocessor program). A memory consistency model is specified by two major characteristics: ordering of memory access requests and atomicity of store requests.

The ordering of memory requests specifies how memory requests may, if at all, be re-ordered relative to the order of their respective load and store instructions in the individual threads of execution in the multiprocessor program. Memory consistency models must define ordering of memory access requests in four general cases: (1) ordering of the memory requests for a load instruction to a following load instruction, (2) ordering of the memory requests for a load instruction to a following store instruction, (3) ordering of the memory requests for a store instruction to a following store instruction, and (4) ordering of the memory requests for a store instruction to a following load instruction. Strong consistency memory models will, in general, preserve all or at least most of these orderings. In particular, many strong consistency memory models enforce the first three orderings, but do not enforce store-to-load ordering. Weak consistency memory models will generally not enforce most or all of these orderings.

Atomicity of store requests refers to whether or not a given thread of execution can read the value of its own store request before other threads, and furthermore, whether the value written to the distributed shared memory system by the store request becomes visible to other threads in a logically instantaneous fashion or whether the value can become visible to other threads at different points in time. A memory consistency model is called "multi-copy atomic" if the value written by a store request of one thread becomes visible to all other threads in a logically instantaneous fashion. In general, strong consistency memory models are multi-copy atomic, and weak consistency memory models do not enforce multi-copy atomicity.

In a given multiprocessor program, program semantics often require that multi-copy atomicity and/or the various orderings between memory access requests are respected. Therefore, in an exemplary embodiment of data processing system 100, in which the distributed shared memory system implements a weak consistency memory model, so called "barrier" (e.g., SYNC) instructions are typically provided to allow the programmer to specify what memory access request orderings and atomicity are to be applied during execution of the multiprocessor program. In particular, a barrier instruction causes the distributed shared memory system to perform any memory accesses initiated by instructions preceding the barrier instruction prior to any memory accesses initiated by instructions following the barrier instruction.

Referring now to FIG. 2A, there is depicted a first exemplary instruction sequence 200 that employs load-reserve and store-conditional instructions to synchronize access to shared memory. In particular, instruction sequence 200 is utilized to update the value of a variable in shared memory.

Instruction sequence 200 begins with a LARX instruction 202 that loads the value of the variable (i.e., var) from shared memory into a private register r1 in the processor core executing the instruction and establishes a reservation for the target address of the variable for the executing hardware thread. The value of the variable is then updated locally in register r1, in this case, by an ADD instruction 204 incrementing the value of the variable by 1. The new value of the variable is then conditionally stored back into shared memory by STCX instruction 206, based, among other things, on whether or not the executing hardware thread still holds a reservation for the target address of the variable. The success or failure of STCX instruction 206 in updating the value of the variable in shared memory is reflected in a condition code register (e.g., one of registers 123) in the processor core. Conditional branch instruction 208 then tests the condition code found in the condition code register and conditionally redirects execution based on the success or failure of STCX instruction 206. If the relevant bit(s) of the condition code register is/are equal to zero, indicating that the conditional update to the variable indicated by STCX instruction 206 failed (e.g., due to an intervening storage-modifying access to the variable by another thread between execution of LARX instruction 202 and STCX instruction 206), instruction sequence 200 will be repeated, and execution branches from conditional branch instruction 208 back to LARX instruction 202. If, however, the conditional update indicated by STCX instruction 206 succeeds, the condition code will be non-zero, and processing will continue with the next sequential instruction following instruction sequence 200.

With reference now to FIG. 2B, there is illustrated a second exemplary instruction sequence 210 that employs load-reserve and store-conditional instructions to coordinate execution of a critical section of a multithreaded program. As indicated, instruction sequence 210 includes, in program order, a polling instruction sequence 212, lock acquisition sequence 214, critical section 216, and lock release sequence 218.

As is known in the art, critical section 216 is, by definition, a portion of a program that includes accesses to a shared resource (e.g., a shared in-memory data set) that must not be concurrently accessed by more than one thread of the multiprocessor program. In order to keep the various hardware threads from making concurrent accesses to the shared resource, the multithreaded program bounds critical section 216 with barrier instructions 240, 244 that order execution of critical section instructions 242 within critical section 216 with respect to both instructions in the same thread that are outside critical section 216. In addition, the multiprocessor program ensures that not more than one thread at a time enters into a critical section by implementing a lock to which access is synchronized by load-reserve and store-conditional instructions.

In particular, a hardware thread attempts to acquire the lock needed to enter critical section 216 through execution of lock acquisition sequence 214. Lock acquisition sequence 214 begins with a LARX instruction 230 that loads the value of the lock variable (i.e., lock) from shared memory into a private register r1 (e.g., one of registers 123) in the executing processor core. The value of the lock variable is then tested by compare instruction 232 to determine whether or not the lock is currently in a locked state (i.e., the lock is held by another hardware thread). If so, conditional branch instruction 234 causes execution to return to the beginning of polling instruction sequence 212 (which is described in greater detail below). If a determination that the lock is not currently held by another hardware thread, a LOAD immediate instruction 236 places a value of "1" representing a locked state into a register r2. A STCX instruction 238 then conditionally updates the lock variable in shared memory to the locked state, thus securing the lock for the executing hardware thread. As before, the success or failure of the STCX instruction in updating the value of the lock variable in shared memory is reflected in a condition code register in the processor core. Conditional branch instruction 239 tests the condition code found in the condition code register and conditionally redirects execution based on the success or failure of STCX instruction 238. If the relevant bit(s) of the condition code register is/are equal to zero, indicating that the conditional update to the lock variable indicated by STCX instruction 238 failed (e.g., due to an intervening storage-modifying access to the lock variable by another hardware thread between execution of LARX instruction 230 and STCX instruction 238), instruction sequence 210 will be repeated from the beginning of instruction polling sequence 212. If, however, the conditional update to the lock variable indicated by STCX instruction 238 succeeds, the condition code will be non-zero, and processing will proceed sequentially to critical section 216. Once critical section 216 completes, the hardware thread will release the lock by updating the lock variable in shared memory by executing a lock release sequence 218 including a LOAD immediate instruction 250 that loads register r2 with a value of "0" representing an unlocked state and a STORE instruction 252 that updates the lock variable in shared memory with this value. Thereafter, execution of the hardware thread proceeds to subsequent instructions, if any.

Although a multiprocessor program could be implemented with only lock acquisition sequence 214, critical section 216, and lock release sequence 218 (i.e., omitting polling instruction sequence 212), in practice such a multiprocessor program would not efficiently utilize the resources of a processing unit, such as a processing unit 102 in FIG. 1. In particular, LARX instruction 230, which is utilized to load the lock value and set the reservation for the lock address upon which the execution of STCX instruction 238 depends, is generally a resource-intensive instruction. Irrespective of the chosen implementation of the cache hierarchy, a LARX instruction requires communication with the coherence point of the cache hierarchy, and in implementations in which that the coherence point is not in the L1 cache, this communication results in the LARX instruction being more resource-intensive than a corresponding LOAD instruction. For example, in the current embodiment, regardless of whether the target address of LARX instruction 230 hits or misses in L1 cache 126, execution of LARX instruction 230 requires allocation of an entry in L2 LDQ 161, dispatch of an RC machine 142 in L2 cache 130, and update of reservation logic 146. Consequently, it is desirable that the hardware thread iterate on a load target address using a less resource-intensive LOAD instruction rather than a more resource-intensive a LARX instruction.

Therefore, it is common for lock acquisition sequence 214 to be proceeded by a polling instruction sequence 212. Polling instruction sequence 212, which is constructed very similarly to the beginning of lock acquisition sequence 214, includes a polling LOAD instruction 220 (rather than a LARX instruction) that loads the lock value from shared memory, a compare instruction 222 that compares the lock value to a value of "1" (indicating a locked state), and a conditional branch instruction 224 that returns execution back to polling LOAD instruction 220 until the lock is found to be in the unlocked state. It is advantageous to employ polling LOAD instruction 220 to poll on the lock variable rather than a LARX instruction since a hit on the target address of polling LOAD instruction 220 in L1 cache 126 will not require utilization of any of the limited resources of L2 cache 130 (e.g., L2 LDQ 161, RC machines 142, and reservation logic 146).

However, if instruction sequence 210 is executed in a conventional data processing system, LARX instruction 230 may read the lock in the locked state even if LOAD instruction 212 read the lock value in an unlocked state, due to another hardware thread of the multithreaded program concurrently attempting to acquire the lock. The present application therefore appreciates that it would be desirable to increase the probability that a hardware thread that reads a lock in an unlocked state with a polling LOAD instruction will still find the lock in the unlocked state when the hardware thread reads the lock with a subsequent LARX instruction. More generally, it would be desirable to increase the probability that a hardware thread that reads a shared memory location identified by load target address with a fronting LOAD instruction preceding a LARX instruction in program order (e.g., LOAD instruction 220) will find the value of the shared memory location unchanged when read by the subsequent LARX instruction. As described in greater detail below, in accordance with at least one embodiment, the probability that a hardware thread will find the value of the shared memory location unchanged when read by the subsequent LARX instruction is increased by extending a protection window for the load target address associated with the fronting LOAD instruction. During this protection window, the RC state machine 142 servicing the fronting LOAD instruction prevents other hardware threads from accessing the shared memory location.

Figure 3:
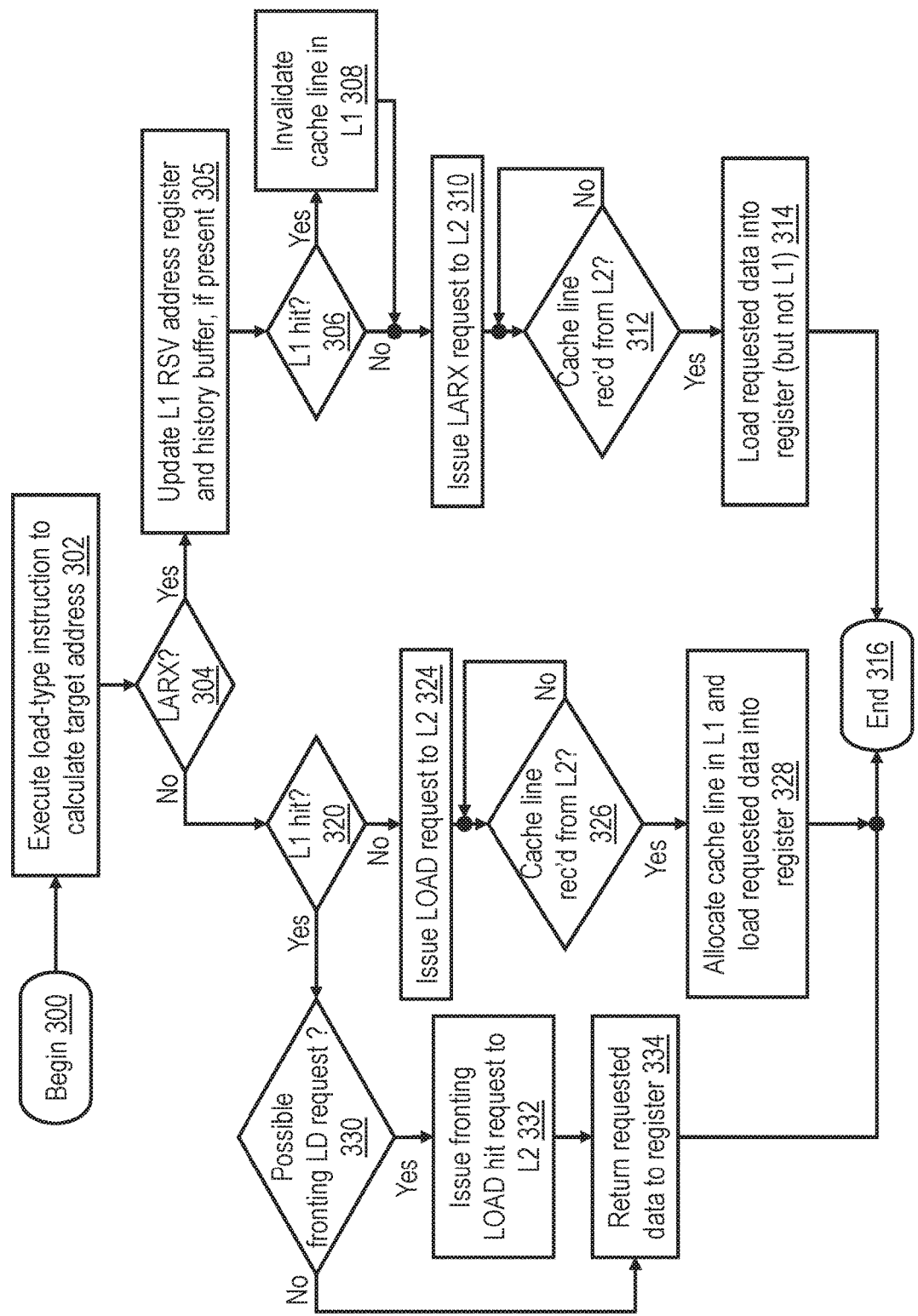
FIG. 3 is a high level logical flowchart of an exemplary method of processing a load-type instruction in a processor core in accordance with one embodiment.

With reference now to FIG. 3, there is depicted a high level logical flowchart of an exemplary method by which a processor core 120 of data processing system 100 processes a load-type instruction in accordance with one embodiment. As shown, the process begins at block 300 and thereafter proceeds to block 302, which illustrates execution units 124 receiving a load-type instruction, such as a LOAD or LARX instruction, from ISU 122 and then executing the load-type instruction to calculate the load target address. In a preferred embodiment, execution units 124 execute LARX instructions within a hardware thread in-order and without pipelining, meaning that the data words(s) requested by a LARX instruction must be loaded to one or more registers 123 in processor core 120 before the next LARX or STCX instruction begins execution. These restrictions simplify the management of reservations by reservation logic 146 in L2 cache 130.

Following execution of the load-type instruction, an indication of the instruction type and the load target address are received from execution units 124 by LD unit 128. As illustrated at block 304, if the indication of the instruction type indicates the load-type instruction executed at block 302 was not a LARX instruction, LD unit 128 performs the processing illustrated at block 320 and following blocks, which are described below. If, however, the load-type instruction executed at block 302 was a LARX instruction, LD unit 128 performs the processing depicted at block 305 and following blocks.

At block 305, LD unit 128 records the load target address of the LARX instruction in the RSV address register 133 of the relevant thread, and if implemented, within history buffer 135. Consequently, if a subsequent LOAD instruction to the same load target is subsequently executed, the LOAD instruction can be identified as a possible fronting load instruction, as discussed further below with reference to block 320. LD unit 128 additionally determines whether or not the load target address of the LARX instruction resides in L1 cache 126 (block 306). If so, LD unit 128 invalidates the cache line containing the load target address in L1 cache 126 (block 308). Those skilled in the art should appreciate that the invalidation of the cache line containing the load target address in L1 cache 126 is a simplifying design choice and that in other embodiments the cache line containing the load target address need not be invalidated in L1 cache 126. Following block 308 or in response to determining that the load target address of the LARX instruction missed in L1 cache 126, LD unit 128 issues a LARX request to L2 cache 130 via load bus 160 (block 310). The LARX request includes, for example, an indication of the request type, the load target address, and an identifier of the issuing thread. After buffering the LARX request in L2 LDQ 161, L2 cache 130 dispatches the LARX request to an RC machine 142 for servicing, as described further below with reference to FIG. 4A.

Next, at block 312, LD unit 128 awaits return of the requested cache line identified by the load target address from L2 cache 130. In response to receipt of the requested cache line, LD unit 128 transfers the data word(s) associated with the load target address into a core register 123, but does not cache the requested cache line in L1 cache 126 (block 314). It should be appreciated that in alternative embodiments that do not invalidate the requested cache line at block 308, the requested cache line can instead be cached in L1 cache 126 to permit subsequent loads (including subsequent load-reserve requests), to hit in L1 cache 126. Following block 314, the process of FIG. 3 terminates at block 316.

Referring now to block 320, in response to LD unit 128 determining that the load-type request is not a LARX request, but is instead a LOAD request, LD unit 128 also determines whether or not the load target address hits in L1 cache 126. If the load target address of the LOAD request misses in L1 cache 126, LD unit 128 issues a LOAD request to the associated L2 cache 130 via load bus 160 (block 324). The LOAD request may include, for example, an indication of the request type, the load target address, and an identifier of the issuing hardware thread. After buffering the LOAD request in L2 LDQ 161, L2 cache 130 dispatches the LOAD request to an RC machine 142 for servicing, as described further below with reference to FIG. 4. Next, at block 326, LD unit 128 waits until the requested cache line containing the load target address is returned by L2 cache 130. In response to receipt of the requested cache line, LD unit 128 transfers the data word(s) associated with the load target address into a core register 123 and allocates the requested cache line in L1 cache 126 (block 328). Following block 328, the process of FIG. 3 terminates at block 316.

Referring again to block 320, in response to LD unit 128 determining that the load target address of the LOAD request hits in L1 cache 126, LD unit 128 additionally determines at block 330 whether the load target address of the LOAD request qualifies the LOAD request as a possible fronting LOAD request. For example, at block 330 LD unit 128 may determine that the LOAD request is a possible fronting LOAD request if its load target address matches the address specified in the issuing thread's RSV address register 133. In addition, at block 330 the RC machine 142 may determine that the LOAD request is a possible fronting LOAD request if its load target address matches the address specified in another thread's RSV address register 148. In embodiments implementing optional history buffer 135, LD unit 128 additionally determines at block 330 whether or not the load target address matches an applicable address stored in history buffer 135. For example, in embodiments in which history buffer 135 includes one shadow address register per thread, the determination at block 330 entails only determining whether the load target address matches the address specified in the single relevant shadow address register associated with the issuing thread. In other embodiments in which history buffer 135 is implemented with a FIFO queue, the matching performed at block 330 may include determining whether the load target address matches any address contained in history buffer 135.

In response to LD unit 128 determining the LOAD request is a possible fronting LOAD request at block 330, LD unit 128 issues a fronting LOAD (F_LOAD) request to L2 LDQ 161 of the associated L2 cache 130 via store bus 164 (block 332). Following block 332, or in response to a negative determination at block 330, LD unit 128 transfers the data word(s) associated with the load target address into a core register 123 (block 334). Following block 334, the process of FIG. 3 terminates at block 316.

Figure 4A:
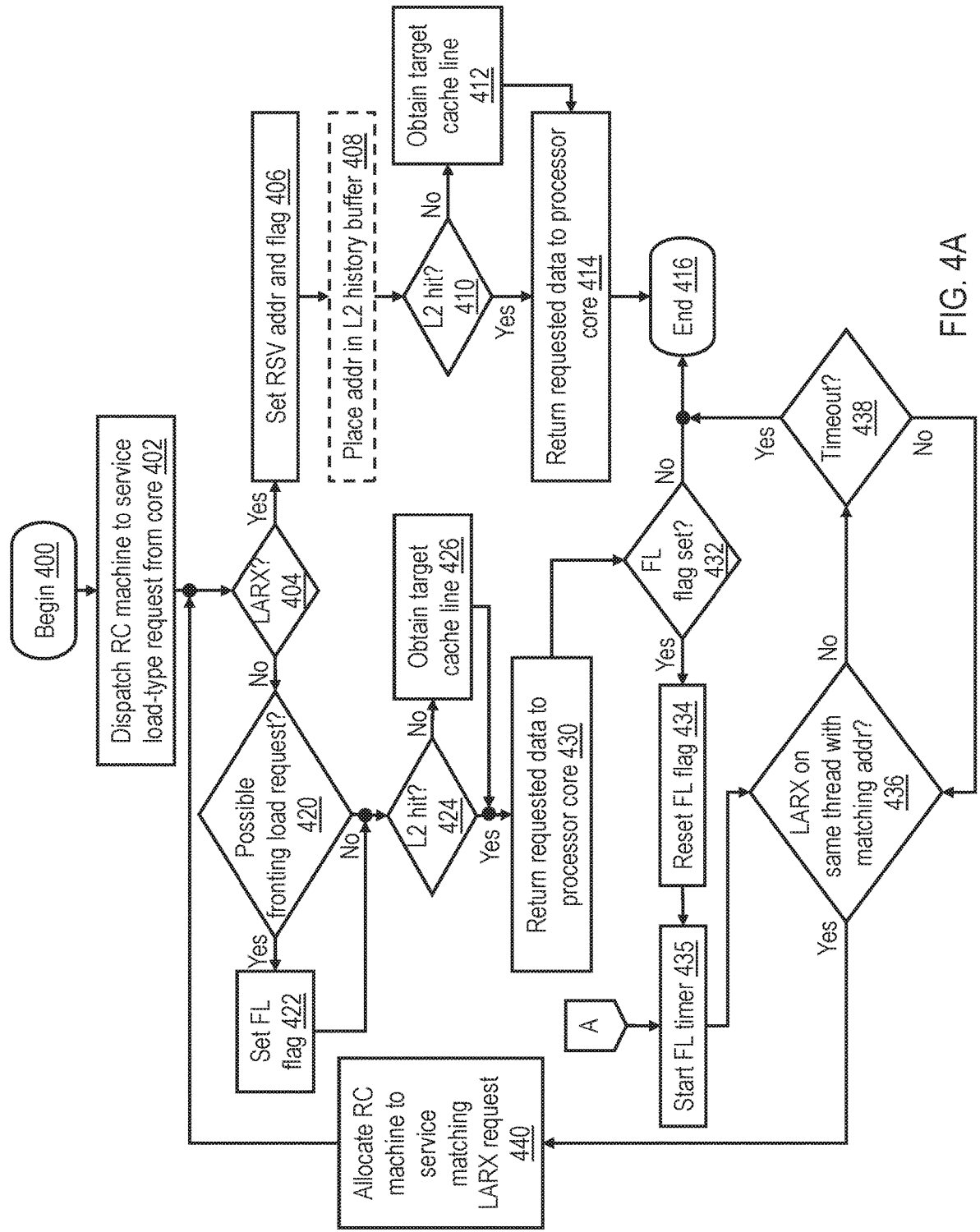
FIG. 4A is a high level logical flowchart of an exemplary method of processing a load-type request in a lower level cache in accordance with one embodiment.

Referring now to FIG. 4A, there is depicted a high level logical flowchart of an exemplary method by which an L2 cache 130 of data processing system 100 processes a load-type request in accordance with one embodiment. The process begins at block 400 and then proceeds to block 402, which depicts L2 cache 126 dispatching an RC machine 142 to service a next load-type request of the associated processor core 120 that is enqueued in L2 LDQ 161. Next, at block 404, the dispatched RC machine 142 determines whether or not the load-type request is a LARX request or a LOAD request. If the load-type request is a LOAD request, the process passes to block 420 and following blocks, which are described below. If, however, RC machine 142 determines at block 404 that the load-type request is a LARX request, the process proceeds to block 406.

As illustrated at block 406, RC machine 142 establishes a reservation for the load target address in L2 cache 130 in the reservation register of the appropriate thread by placing the load target address in the appropriate reservation address field 148 and setting the associated reservation flag 150. Depending on if a history buffer 152 is implemented and, if present, the policy governing the insertion of new entries into history buffer 152, RC machine 142 may additionally insert the load target address of the LARX request into the history buffer 152 (block 408). It should be noted that the target address is preferably inserted into history buffer 152 in at most one of block 408 and block 632 (described below).

At block 410, RC machine 142 additionally determines whether or not the load target address of the LARX request hit in L2 storage array and directory 140. If so, the process passes directly to block 414. If not, RC machine 142 issues one or more requests on system interconnect 104 in order to obtain a copy of the requested cache line from another cache hierarchy or system memory 108 (block 412). Following block 412, the process proceeds to block 414, which depicts RC machine 142 returning the requested cache line to the associated processor core 120. Thereafter, the RC machine 142 servicing the LARX request transitions from the busy state to the idle state, and the process of FIG. 4A ends at block 416.

Referring now to block 420, if the load-type request that the RC machine 142 is dispatched to service is a LOAD request rather than a LARX request, RC machine 142 determines at block 420 whether the load target address of the LOAD request qualifies the LOAD request as a possible fronting LOAD request. For example, at block 420 RC machine 142 may determine that the LOAD request is a possible fronting LOAD request if its load target address matches the address specified in the issuing thread's RSV address register 148. In addition, at block 420 the RC machine 142 may determine that the LOAD request is a possible fronting LOAD request if its load target address matches the address specified in another thread's RSV address register 148. In embodiments implementing history buffer 152. RC machine 142 additionally determines at block 420 whether or not the load target address matches an applicable address stored in history buffer 152. For example, in embodiments in which history buffer 152 includes one shadow address register per thread, the determination at block 420 entails only determining whether the load target address matches the address specified in the single relevant shadow address register associated with the issuing thread. In other embodiments in which history buffer 152 is implemented with a FIFO queue, the matching performed at block 420 may include determining whether the load target address matches any address contained in history buffer 152. In response to RC machine 142 finding a match for the load target address at block 420, RC machine 142 sets an internal fronting load (FL) flag to indicate detection of a likely fronting LOAD request made in advance of a yet-to-be-received LARX request (block 422). Following block 422 or in response to a failure to find a match at block 420, the process proceeds to block 424.

At block 424, RC machine 142 additionally determines whether or not the load target address of the LOAD request hits in L2 storage array and directory 140. If so, the process passes directly to block 430. If not, RC machine 142 issues a request on system interconnect 104 in order to obtain a copy of the requested cache line from another cache hierarchy or system memory 108 (block 426). Following block 426, the process proceeds to block 430, which depicts RC machine 142 returning the requested cache line to the associated processor core 120. The return of the requested cache line to the associated processor core 120 at block 430 ends all operations of RC machine 142 required to service the LOAD request.

At block 432, RC machine 142 determines whether or not its FL flag is set. If not, RC machine 142 transitions from the busy state to the idle state, and the process of FIG. 4A ends at block 416. If, however, RC machine 142 determines at block 432 that its FL flag 432 is set, RC machine 142 resets its FL flag (block 434) and starts a FL timer that defines the duration of a fronting load protection interval during which the RC machine 142 will remain in the busy state to protect the load target address against any conflicting core request or snooped request (block 435). The RC machine 142 then enters a monitoring loop including blocks 436 and 438, which represents RC machine 142 monitoring for the first to occur of two events. At block 436, RC machine 142 monitors for receipt of a matching LARX request to the same load target address as the fronting LOAD request and issued by the same thread. At block 438, RC machine 142 monitors for timeout of the FL counter. If the FL counter times out at block 438 prior to detection of matching LARX request at block 436, the RC machine 142 transitions from the busy state to the idle state (ending its protection of the load target address), and the process of FIG. 4A terminates at block 416. If, however, a matching LARX request is received prior to time out of the FL counter, the process of FIG. 4A exits the monitoring loop and passes to block 440.

At block 440, the L2 cache 130 allocates an RC machine 142 to service the matching LARX request. In a preferred embodiment, the same RC machine 142 that was utilized to service the fronting LOAD request simply remains in an active state and is also utilized to service the matching LARX request. In an alternative embodiment, the matching LARX request is serviced with a different RC machine 142, and the RC machine 142 utilized to service the polling LOAD request returns to an idle state at allocation of the other RC machine 142 to service the LARX request. Following block 440, the process of FIG. 4A returns to blocks 404-416 in order for the allocated RC machine 142 to service matching LARX request.

With reference now to FIG. 4B, there is illustrated a high level logical flowchart of an exemplary method by which an L2 cache 130 of data processing system 100 processes a fronting load hit request in accordance with one embodiment. The process begins at block 450 and then proceeds to block 452, which depicts L2 cache 126 dispatching an RC machine 142 to service a next fronting LOAD (F_LOAD) request of the associated processor core 120 that is enqueued in L2 LDQ 161, as discussed above with reference to block 332 of FIG. 3. Following block 452, the process passes through page connector A to block 435 and following blocks of FIG. 4A, which have been described. Thus, because a fronting LOAD hit request already explicitly identifies that the request is a fronting LOAD and implies that the load target address hits in L1 cache 126, the determinations depicted at blocks 404, 420 and 424 can be omitted for fronting LOAD hit requests, expediting their handling.

With reference now to FIG. 5, there is illustrated a high level logical flowchart of an exemplary method of processing a store-type instruction in a processor core in accordance with one embodiment. As depicted, the process begins at block 500 and thereafter proceeds to block 502, which illustrates execution units 124 receiving a store-type instruction, such as a STORE or STCX instruction, from ISU 122 and then executing the store-type instruction to calculate the store target address. As with the LARX execution described above, execution units 124 also preferably execute STCX instructions appearing in the same hardware thread in-order and without pipelining with respect to both LARX and STCX instructions.

Upon execution of the store-type instruction, execution units 124 place a corresponding store-type request including the store target address calculated by execution of the STCX instruction, a thread identifier, and store data within L1 STQ 127. In one preferred embodiment, L1 STQ 127 is implemented as a shared FIFO queue that buffers and orders store requests of all threads executing within processor unit 102. When the store-type request corresponding to the executed store-type instruction reaches the bottom or commit entry of L1 STQ 127, L1 STQ 127 determines at block 504 whether or not the store-type request is a STCX request. If so, the process passes to block 512 and following blocks, which are described below. If, however, the store-type request is not a STCX request, but is instead a STORE request, the process of FIG. 5 proceeds from block 504 to block 506.

At block 506, L1 STQ 127 additionally determines if the store target address of the STORE request hits in L1 cache 126. If so, L1 STQ 127 updates the target cache line held in L1 cache 126 with the store data (block 508). Following block 508 or in response to the store target address missing in L1 cache 126 at block 506, L1 STQ 127 removes the STORE request from L1 STQ 127 and issues the STORE request to L2 STQ 166 of L2 cache 130 via store bus 164 (block 510). Following block 510, the process of FIG. 5 ends at block 530.

Referring now to block 512, if L1 STQ 127 determines at block 504 that the store-type request is a STCX request, L1 STQ 127 additionally determines if the store target address of the STCX request hits in L1 cache 126. If so, L1 STQ 127 invalidates the target cache line held in L1 cache 126 (block 514). Following block 514 or in response to the store target address missing in L1 cache 126 at block 512, L1 STQ 127 issues the STCX request to L2 STQ 166 of L2 cache 130 via store bus 164 (block 516). L1 STQ 127 then awaits return via pass/fail bus 174 of a pass/fail indication for the STCX request indicating whether or not the STCX request succeeded in updating L2 cache 130 (block 518). In response to receipt of the pass/fail indication via pass/fail bus 174, processor core 120 provides the pass/fail indication to execution units 124 (e.g., to indicate whether the path of execution should change) and, as shown at blocks 520-524, updates a condition code register 123 to indicate whether the STCX request passed or failed. Thereafter, the STCX request is deallocated from L1 STQ 127, and the process of FIG. 5 terminates at block 530.

Figure 6A:
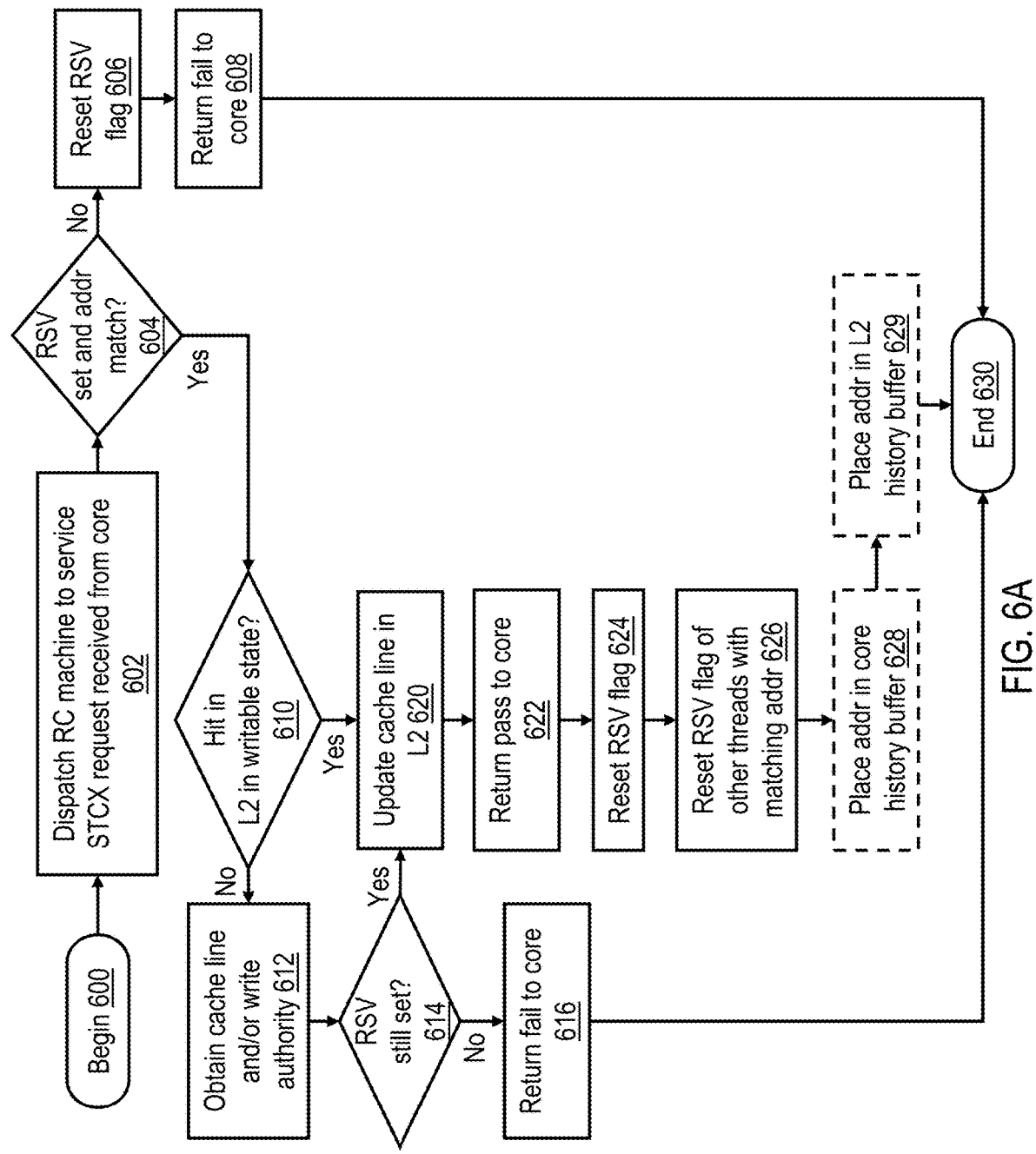
FIG. 6A is a high level logical flowchart of an exemplary method of processing a store-conditional request in lower level cache in accordance with one embodiment.

Referring now to FIG. 6A, there is depicted a high level logical flowchart of an exemplary method of processing a store-conditional (STCX) request in a lower level cache in accordance with one embodiment. As described above, STCX requests are received by L2 cache 130 within L2 STQ 166 via store bus 164. In some embodiments, L2 STQ 166 may be implemented, like L1 STQ 127, as a FIFO queue. In such embodiments, the process begins at block 600 in response to receipt of a store-type request in the bottom entry of L2 STQ 166. The store request at the bottom entry of L2 STQ 166 will then be selected for dispatch to an idle RC machine 142 for processing, as shown at block 602.

In response to receipt of a STCX request for servicing, the dispatched RC machine 342 transitions to the busy state and determines at block 604 whether or not the issuing hardware thread has a valid reservation for the store target address by determining whether the thread's RSV flag 150 is set and the associated RSV register 148 specifies a reservation address matching the store target address (block 604). If not, RC machine 342 resets the RSV flag 150 of the issuing hardware thread (block 606) and returns a fail indication to the processor core 120 via pass/fail bus 174 to report that the STCX request made no update to L2 cache 130 (block 608). Thereafter, the RC machine 142 allocated to service the STCX request returns to the idle state, and the process of FIG. 6 ends at block 630.

Returning to block 604, in response to RC machine 142 determining that the issuing hardware thread has a valid reservation for the store target address of the STCX request, RC machine 142 determines whether or not the store target address of the STCX request hits in L2 storage array and directory 140 in a "writeable" coherence state that confers authority on L2 cache 130 to modify the target cache line (block 610). If so, the STCX will succeed in the conditional update of shared memory, and the process passes to block 620, which is described below. If not, RC machine 142 obtains authority to modify the target cache line and, if necessary, a copy of the target cache line from another cache hierarchy or memory controller 106 by issuing one or more requests on system interconnect 104 (block 612). At block 614, the RC machine 142 again checks whether or not the issuing hardware thread has a valid reservation for the store target address of the STCX request, as the reservation may have been reset due to, among other reasons, an intervening store access of another hardware thread while a copy of the target cache line in a writeable coherence state was being obtained at block 612. In response to a determination that the reservation is still set, the process passes to block 620, which is described below. However, in response to a determination at block 614 that the reservation is not still set (i.e., has been reset by the access of another hardware thread), RC machine 142 returns a fail indication to processor core 120 via pass/fail bus 174 to report that the STCX request failed to update L2 cache 130 (block 616). The process thereafter ends at block 630.

Block 620 illustrates RC machine 142 updating the target cache line in L2 storage array and directory 140 with the store data of the STCX request. RC machine 142 additionally returns a pass indication to processor core 120 via pass/fail bus 174 to report successful update of the L2 cache 130 (block 622). RC machine 142 also resets the issuing hardware thread's RSV flag 150 (block 624), as well as the RSV flag 150 of any other thread specifying a matching store target address in its associated RSV address register 148 (block 626). It should be noted that in this exemplary embodiment a STCX request only cancels the reservations of other threads at block 626 after it is verified that the STCX is going to succeed in its conditional update of shared memory. If history buffer 135 is implemented in LD unit 128 and is not updated at block 305 with the target address of the preceding LARX request, RC machine 142 causes the target address of the STCX to be stored in history buffer 135 (block 628). Similarly, if history buffer 152 is implemented in L2 cache 130 and is not updated at block 408 with the target address, RC machine 142 causes the target address of the STCX to be stored in history buffer 152 (block 629). Thereafter, RC machine 142 returns to the idle state, and the process of FIG. 6A ends at block 630. Although FIG. 6A depicts an embodiment in which the target address of a STCX request is inserted into history buffers 135 and 152 after a determination is made at block 604 that the STCX request is successful, it should be appreciated that in other embodiments the target address can be inserted into history buffers 135 and 152 prior to this determination. For example, among other choices, the target address of the STCX request may be inserted into history buffer 135 immediately after block 504 and into history buffer 152 immediately after block 602.

Figure 6B:
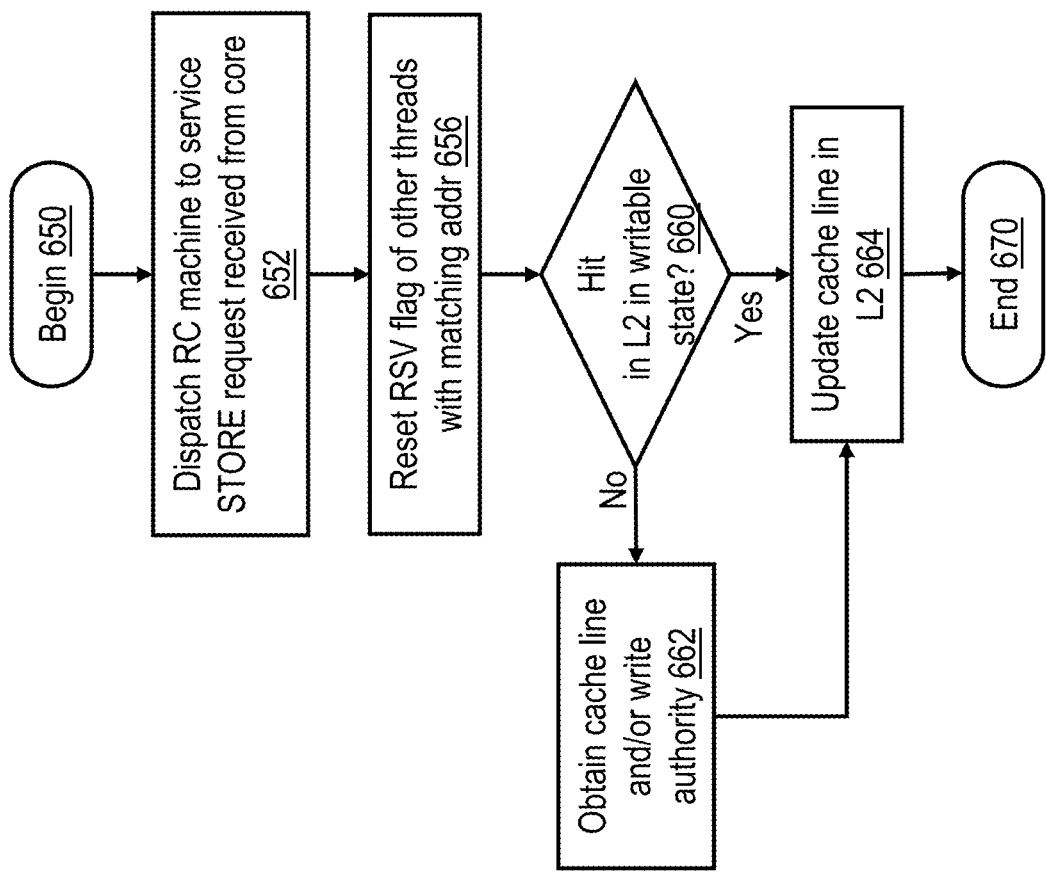
FIG. 6B is a high level logical flowchart of an exemplary method of processing a store request in lower level cache in accordance with one embodiment.

With reference now to FIG. 6B, there is depicted a high level logical flowchart of an exemplary method of processing a STORE request in a lower level cache in accordance with one embodiment. The process of FIG. 6B begins at block 650 as a STORE request is received by L2 cache 130 within L2 STQ 166. The STORE request is thereafter selected for dispatch to an idle RC machine 142 for processing, as shown at block 652.

In response to receipt of a STCX request for servicing, the dispatched RC machine 142 transitions to a busy state and resets the RSV flag 150 of any thread other than the initiating hardware thread that specifies a matching store target address in its associated RSV address register 148 (block 656). RC machine 142 additionally determines whether or not the store target address of the STORE request hits in L2 storage array and directory 140 in a writeable coherence state that confers authority on L2 cache 130 to modify the target cache line (block 660). If so, the process passes to block 664, which is described below. If not, RC machine 142 obtains authority to modify the target cache line and, if necessary, a copy of the target cache line from another cache hierarchy or memory controller 106 by issuing one or more requests on system interconnect 104 (block 662). At block 664, RC machine 142 updates the target cache line in L2 storage array and directory 140 with the store data of the STORE request. Thereafter, RC machine 142 returns to the idle state, and the process of FIG. 6B ends at block 670.

Figure 7:
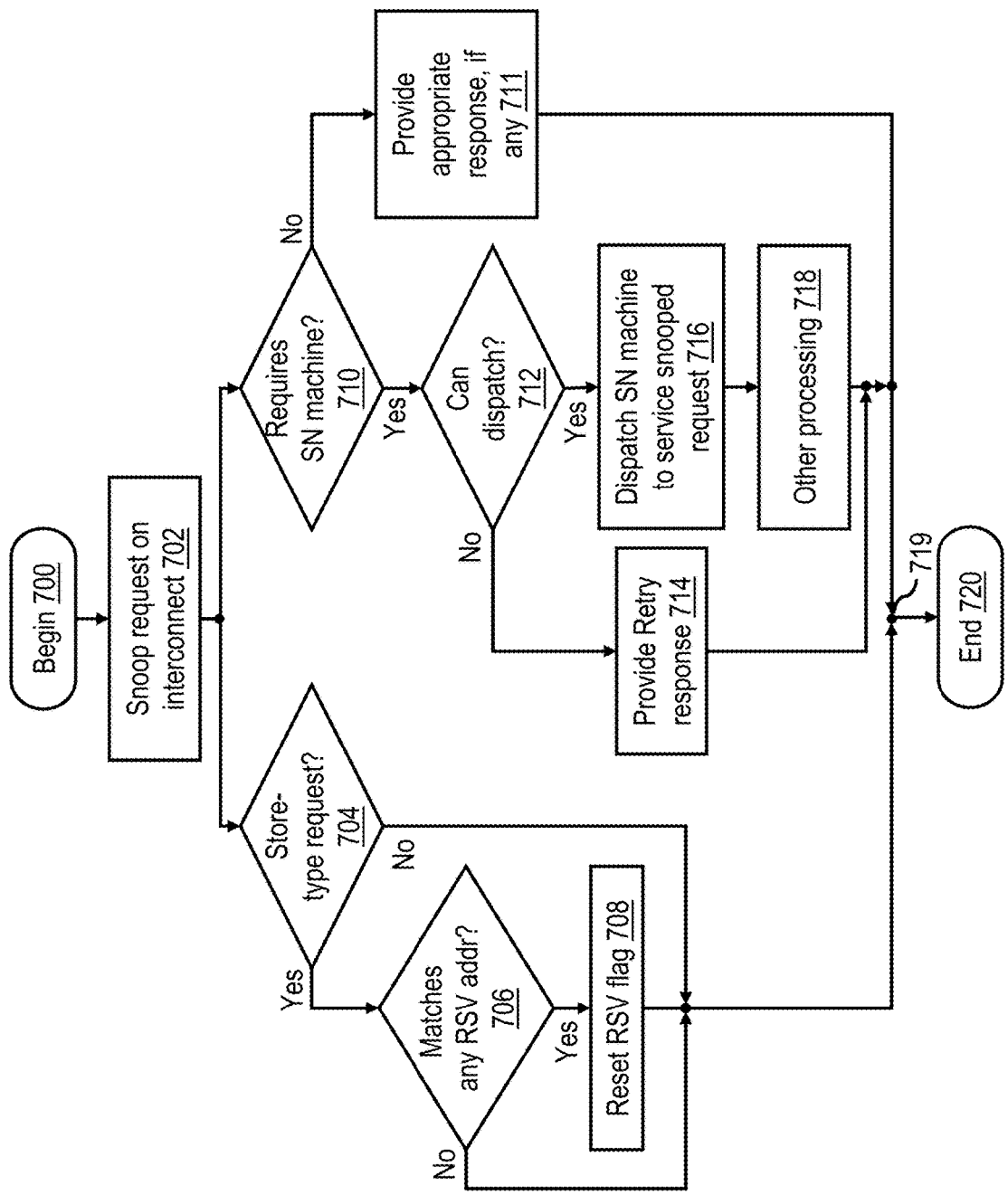
FIG. 7 is a high level logical flowchart of an exemplary method of processing a snooped request in accordance with one embodiment.

With reference now to FIG. 7, there is illustrated a high level logical flowchart of an exemplary method by which the L2 cache 130 of a processing unit 102 services a request snooped from a system interconnect in accordance with one embodiment. Those skilled in the art will appreciated that multiple instances of this process can be active in a given L2 cache 230 concurrently. As depicted, the process begins at block 700 and thereafter proceeds to block 702, which illustrates an L2 cache 130 snooping a request (e.g., issued by anther processing unit 102) on system interconnect 104 via snoop bus 170. Following block 702, the process of FIG. 7 bifurcates into two concurrent parallel subprocesses—a reservation update subprocess depicted at blocks 704-708 in which the affect, if any, of the snooped request on pending reservations tracked in the L2 cache 130 is managed, and a request servicing subprocess at blocks 710-718 in which the snooped request is serviced by the snooping L2 cache 130, if necessary. Following completion of both subprocesses, the two subprocesses merge at join point 719, and process of FIG. 7 ends at block 720.

Referring first to the reservation update subprocess, the snooping L2 cache 130 determines at block 704 whether or not the snooped request is a store-type request that modifies or requests authority to modify shared memory. If not, no update to any local reservation is required, and the reservation update subprocess proceeds to join point 719. If, however, the snooped request is a store-type request that indicates the intention to modify a target cache line, L2 cache 130 resets the RSV flag 150 associated with any of its RSV address registers 148 that stores the address of the target cache line (blocks 706-708). Following either block 706 or block 708, the reservation update subprocess proceeds to join point 719.

Referring now to the request servicing subprocess, L2 cache 130 determines at block 710 whether or not servicing the snooped request requires allocation of a SN machine 144. If not, no SN machine 144 is dispatched to service the snooped request. The L2 cache 130 will nevertheless provide the appropriate coherence response, if any (block 711).

The request servicing subprocess then proceeds to join point 719. If, however, L2 cache 130 determines at block 710 that a SN machine 144 is required to service the snooped request, L2 cache 130 further determines at block 712 whether or not a SN machine 144 can presently be dispatched. In order to dispatch a SN machine 144, a SN machine 144 must be available (i.e., in the idle state) and no RC machine 146 or SN machine 144 can be busy servicing a request having a target cache line address matching that specified by the snooped request (among other dispatch constraints). Thus, for example, an RC machine 146 allocated to service a fronting LOAD request or fronting LOAD hit request (as discussed above with reference to FIGS. 4A-4B) will prevent the dispatch of a local SN machine 144 to service a snooped request specifying a conflicting (i.e., matching) target cache line address.

In response to a determination at block 712 that a SN machine 144 cannot presently be dispatched to service the snooped request, L2 cache 130 provides a Retry coherence response on system interconnect 104 to indicate its present inability to service the snooped request (block 714). (In response to this Retry coherence response, the source of the snooped request may later represent the request on system interconnect 104.) Following block 714, the request servicing subprocess proceeds to join point 719. If, however, L2 cache 130 determines at block 712 that a SN machine 144 can presently be dispatched to service the snooped request, L2 cache 130 dispatches an idle SN machine 144 to service the snooped request (block 716). The dispatched snoop machine 144 transitions from the idle state to the busy state and then performs at block 718 whatever additional processing is required to service the snooped request (e.g., updating L2 storage array and directory 140 and/or L1 cache 126, sourcing a copy of the target cache line, providing protocol-dependent coherence responses, etc.). Following completion of its processing at block 718, the SN machine 144 dispatched to service the snooped request transitions from the busy state to the idle state, and the request servicing subprocess proceeds to join point 719.

Figure 8:
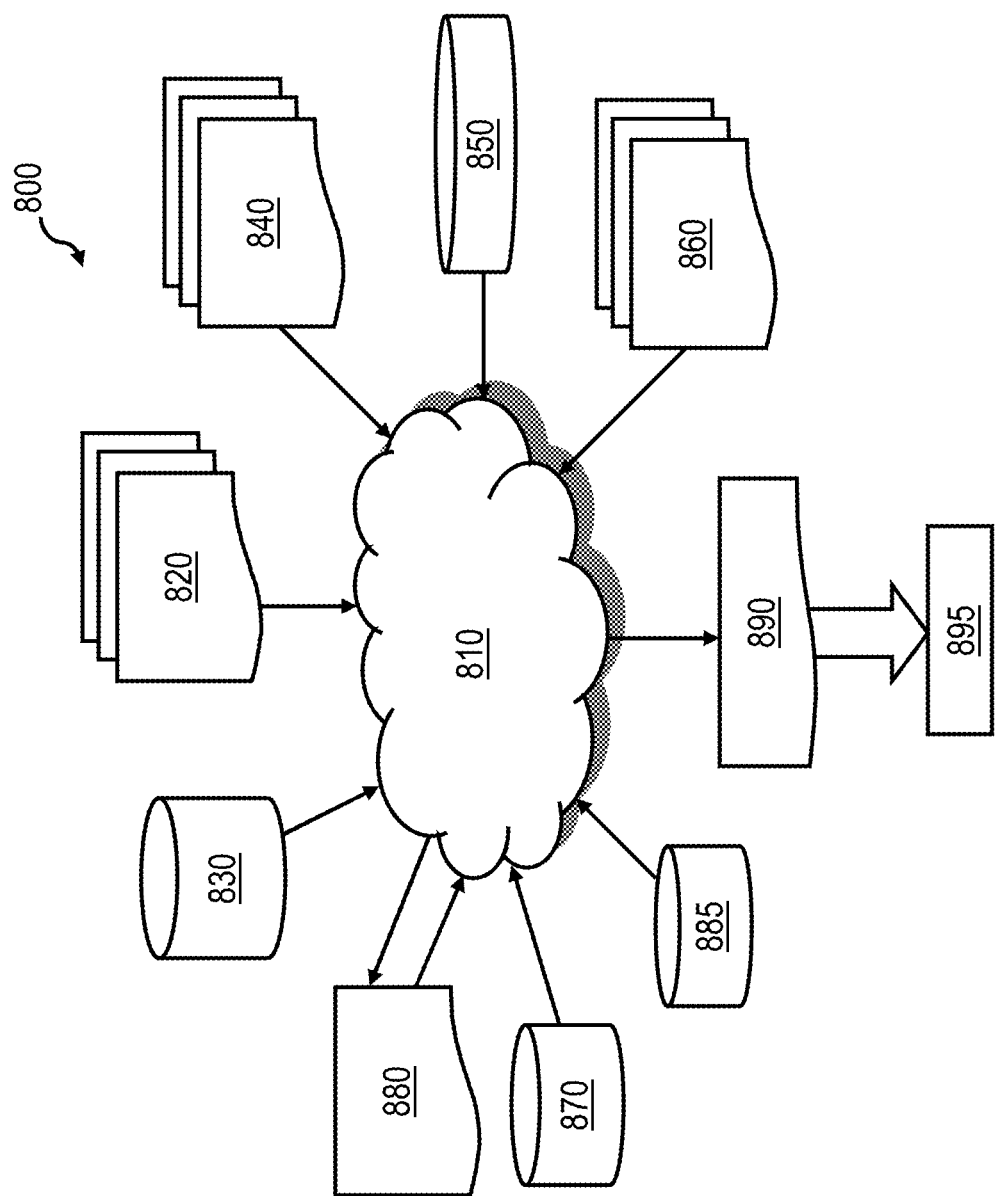
FIG. 8 is a block diagram of an exemplary design flow.

With reference now to FIG. 8, there is illustrated a block diagram of an exemplary design flow 800 used for example, in semiconductor IC logic design, simulation, test, layout, and manufacture. Design flow 800 includes processes, machines and/or mechanisms for processing design structures or devices to generate logically or otherwise functionally equivalent representations of the design structures and/or devices described above and shown herein. The design structures processed and/or generated by design flow 800 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 800 may vary depending on the type of representation being designed. For example, a design flow 800 for building an application specific IC (ASIC) may differ from a design flow 800 for designing a standard component or from a design flow 800 for instantiating the design into a programmable array, for example a programmable gate array (PGA) or a field programmable gate array (FPGA) offered by Altera® Inc. or Xilinx® Inc.

FIG. 8 illustrates multiple such design structures including an input design structure 820 that is preferably processed by a design process 810. Design structure 820 may be a logical simulation design structure generated and processed by design process 810 to produce a logically equivalent functional representation of a hardware device. Design structure 820 may also or alternatively comprise data and/or program instructions that when processed by design process 810, generate a functional representation of the physical structure of a hardware device. Whether representing functional and/or structural design features, design structure 820 may be generated using electronic computer-aided design (ECAD) such as implemented by a core developer/designer. When encoded on a machine-readable data transmission, gate array, or storage medium, design structure 820 may be accessed and processed by one or more hardware and/or software modules within design process 810 to simulate or otherwise functionally represent an electronic component, circuit, electronic or logic module, apparatus, device, or system such as those shown herein. As such, design structure 820 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 810 preferably employs and incorporates hardware and/or software modules for synthesizing, translating, or otherwise processing a design/simulation functional equivalent of the components, circuits, devices, or logic structures shown herein to generate a netlist 880 which may contain design structures such as design structure 820. Netlist 880 may comprise, for example, compiled or otherwise processed data structures representing a list of wires, discrete components, logic gates, control circuits, PO devices, models, etc. that describes the connections to other elements and circuits in an integrated circuit design. Netlist 880 may be synthesized using an iterative process in which netlist 880 is resynthesized one or more times depending on design specifications and parameters for the device. As with other design structure types described herein, netlist 880 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 810 may include hardware and software modules for processing a variety of input data structure types including netlist 880. Such data structure types may reside, for example, within library elements 830 and include a set of commonly used elements, circuits, and devices, including models, layouts, and symbolic representations, for a given manufacturing technology (e.g., different technology nodes, 32 nm, 45 nm, 80 nm, etc.). The data structure types may further include design specifications 840, characterization data 850, verification data 860, design rules 890, and test data files 885 which may include input test patterns, output test results, and other testing information. Design process 810 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 810 without deviating from the scope and spirit of the invention. Design process 810 may also include modules for performing standard circuit design processes such as timing analysis, verification, design rule checking, place and route operations, etc.

Design process 810 employs and incorporates logic and physical design tools such as HDL compilers and simulation model build tools to process design structure 820 together with some or all of the depicted supporting data structures along with any additional mechanical design or data (if applicable), to generate a second design structure 890. Design structure 890 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 820, design structure 890 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 890 may comprise a compiled, executable HDL simulation model that functionally simulates the devices shown herein.

Design structure 890 may also employ a data format used for the exchange of layout data of integrated circuits and/or symbolic data format (e.g., information stored in a GDSII (GDS2), GL1, OASIS, map files, or any other suitable format for storing such design data structures). Design structure 890 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 890 may then proceed to a stage 895 where, for example, design structure 890: proceeds to tape-out, is released to manufacturing, is released to a mask house, is sent to another design house, is sent back to the customer, etc.

As has been described, in at least one embodiment, a data processing system includes multiple processing units all having access to a shared memory. A processing unit of the data processing system includes a processor core including an upper level cache, core reservation logic that records addresses in the shared memory for which the processor core has obtained reservations, and an execution unit that executes memory access instructions including a fronting load instruction. Execution of the fronting load instruction generates a load request that specifies a load target address. The processing unit further includes lower level cache that, responsive to receipt of the load request and based on the load request indicating an address match for the load target address in the core reservation logic, protects the load target address against access by any conflicting memory access request during a protection interval following servicing of the load request.

While various embodiments have been particularly shown and described, it will be understood by those skilled in the art that various changes in form and detail may be made therein without departing from the spirit and scope of the appended claims and these alternate implementations all fall within the scope of the appended claims.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although a particular embodiment of a memory hierarchy has been described in which L1 and L2 caches are incorporated within a processing unit, those skilled in the art will appreciate that a greater or lesser number of levels of cache hierarchy may be employed. Further, these levels of cache hierarchy may include in-line or lookaside caches and may include one or more levels of off-chip cache. Further, the level of cache hierarchy at which coherency is determined may differ from that discussed with reference to the described embodiments.

Further, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

The program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A processing unit for a data processing system including multiple processing units all having access to a shared memory, said processing unit comprising:
   a processor core including:
   core reservation logic that records, within the processor core, addresses in the shared memory for which the processor core has obtained reservations; and
   an execution unit that executes memory access instructions including a fronting load instruction, wherein the processor core, based on execution of the fronting load instruction and an address match of a load target address associated with the fronting load instruction in the core reservation logic, generates a fronting load hit request specifying the load target address;
   a cache hierarchy including an upper level cache and a lower level cache, wherein the lower level cache is configured to:
   receive from the processor core the fronting load hit request, and based on receipt of the fronting load hit request indicating an address match for the load target address in the core reservation logic of the processor core, protect the load target address against access by any conflicting memory access request during a protection interval following servicing of the fronting load hit request; and
   thereafter end the protection interval for the load target address based on the lower level cache concluding servicing of a subsequent load-reserve request that is received from the processor core and that specifies the load target address.

2. The processing unit of claim 1, wherein:
   the fronting load instruction is executed by a given hardware thread;
   the subsequent load-reserve request is initiated by the given hardware thread.

3. The processing unit of claim 2, wherein:
   the lower level cache includes a plurality of read-claim state machines including a read-claim state machine; and
   the read-claim state machine services the fronting load hit request, remains in a busy state following servicing of the fronting load hit request, and, while in the busy state, services the subsequent load-reserve request.

4. The processing unit of claim 2, wherein:
   the processor core, following execution of the fronting load instruction, executes in the given hardware thread a load-reserve instruction that generates the subsequent load-reserve request; and
   the lower level cache, based on receipt of the subsequent load-reserve request, establishes a reservation for the load target address.

5. The processing unit of claim 1, and further comprising a timer that determines a maximum duration of the protection interval established by the fronting load hit request.

6. The processing unit of claim 1, wherein the core reservation logic includes a plurality of reservation registers that buffer addresses for which hardware threads of the processor core hold reservations.

7. The processing unit of claim 1, wherein
   the core reservation logic further includes a history buffer that buffers addresses for which hardware threads of the processor core formerly held reservations; and the processor core is configured to determine an address match for the load target address by reference to the history buffer.

8. A data processing system, comprising:
the multiple processing units, including the processing unit of claim 1;
the shared memory; and
a system interconnect communicatively coupling the shared memory and the multiple processing units.

9. A method of data processing in a processing unit of a data processing system including multiple processing units all having access to a shared memory, wherein the processing unit includes a processor core, an upper level cache, and a lower level cache, said method comprising:
recording, within core reservation logic in the processor core, addresses in the shared memory for which the processor core has obtained reservations;
the processor core executing memory access instructions including a fronting load instruction;
the processor core, based on execution of the fronting load instruction and an address match of a load target address associated with the fronting load instruction in the core reservation logic, generating a fronting load hit request that specifies the load target address;
the lower level cache receiving the fronting load hit request, and based on receipt of the fronting load hit request indicating an address match for the load target address in the core reservation logic of the processor core, protecting the load target address against access by any conflicting memory access request during a protection interval following servicing of the fronting load hit request and
the lower level cache thereafter ending the protection interval based on the lower level cache concluding servicing of a subsequent load-reserve request that is received from the processor core and that specifies the load target address.

10. The method of claim 9, wherein:
the fronting load instruction is executed by a given hardware thread;
the subsequent load-reserve request is initiated by the given hardware thread.

11. The method of claim 10, wherein:
the processing unit includes a plurality of read-claim state machines including a read-claim state machine; and
the method further comprising the read-claim state machine servicing the fronting load hit request, remaining in a busy state following servicing of the fronting load hit request, and, while in the busy state, servicing the subsequent load-reserve request.

12. The method of claim 10, and further comprising:
the processor core, following execution of the fronting load instruction, executing in the given hardware thread a load-reserve instruction that generates the subsequent load-reserve request; and
the lower level cache, based on receipt of the subsequent load-reserve request, establishing a reservation for the load target address.

13. The method of claim 9, and further comprising determining a maximum duration of the protection interval established by the fronting load hit request by reference to a timer.

14. The method of claim 9, wherein the recording includes the core reservation logic buffering addresses for which hardware threads of the processor core hold reservations in a plurality of reservation registers within the processor core.

15. The method of claim 9, wherein
the recording includes the core reservation logic buffering, in a history buffer, addresses for which hardware threads of the processor core formerly held reservations; and
the method further comprises the processor core determining the address match for the load target address by reference to the history buffer.

16. A design structure tangibly embodied in a non-transitory machine-readable storage device for designing, manufacturing, or testing an integrated circuit, the design structure comprising:
a processing unit for a multiprocessor data processing system including a shared memory, the processing unit including:
a processor core including:
core reservation logic that records, within the processor core, addresses in the shared memory for which the processor core has obtained reservations; and
an execution unit that executes memory access instructions including a fronting load instruction, wherein the processor core, based on execution of the fronting load instruction and an address match of a load target address associated with the fronting load instruction in the core reservation logic, generates a fronting load hit request specifying the load target address;
a cache hierarchy including an upper level cache and a lower level cache, wherein the lower level cache is configured to:
receive from the processor core the fronting load hit request, and based on receipt of the fronting load hit request indicating an address match for the load target address in the core reservation logic of the processor core, protect the load target address against access by any conflicting memory access request during a protection interval following servicing of the fronting load hit request; and
thereafter end the protection interval for the load target address based on the lower level cache concluding servicing of a subsequent load-reserve request that is received from the processor core and that specifies the load target address.

17. The design structure of claim 16, wherein:
the fronting load instruction is executed by a given hardware thread;
the subsequent load-reserve request is initiated by the given hardware thread.

18. The design structure of claim 17, wherein:
the lower level cache includes a plurality of read-claim state machines including a read-claim state machine; and
the read-claim state machine services the fronting load hit request, remains in a busy state following servicing of the fronting load hit request, and, while in the busy state, services the subsequent load-reserve request.

19. The design structure of claim 17, wherein:
the processor core, following execution of the fronting load instruction, executes in the given hardware thread a load-reserve instruction that generates the subsequent load-reserve request; and
the lower level cache, based on receipt of the subsequent load-reserve request, establishes a reservation for the load target address.

20. The design structure of claim 16, wherein
the core reservation logic further includes a history buffer that buffers addresses for which hardware threads of the processor core formerly held reservations; and
the processor core is configured to determine an address match for the load target address by reference to the history buffer.

\* \* \* \* \*